(12) United States Patent
Dowty et al.

(10) Patent No.: US 10,696,405 B2
(45) Date of Patent: Jun. 30, 2020

(54) AIRLINER PASSENGER SUITE SEATING ARRANGEMENTS WITH SHARED AISLE SUITE ACCESS

(71) Applicant: B/E Aerospace, Inc., Winston-Salem, NC (US)

(72) Inventors: Mark B. Dowty, Rural Hall, NC (US); Tracy N. Pence, King, NC (US); Matt Round, London (GB); Vien McArthur Nguyen, London (GB); Martin Hong Lun Mo, Wimbledon (GB); Erik Eivind Sutton Nilsen, Seattle, WA (US); Anthony Michael Charles, Mercer Island, WA (US); Brian Jeremy Conner, Seattle, WA (US); Harry Howard Hanson, Lake Forest Park, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/377,364

(22) Filed: Apr. 8, 2019

(65) Prior Publication Data
US 2019/0233117 A1 Aug. 1, 2019

Related U.S. Application Data

(63) Continuation of application No. 15/280,206, filed on Sep. 29, 2016, now Pat. No. 10,549,857.
(Continued)

(51) Int. Cl.
*B64D 11/06* (2006.01)
*B64D 11/00* (2006.01)

(52) U.S. Cl.
CPC .... *B64D 11/0601* (2014.12); *B64D 11/00153* (2014.12); *B64D 11/06* (2013.01);
(Continued)

(58) Field of Classification Search
CPC .............. B64D 11/00153; B64D 11/06; B64D 11/0601; B64D 11/00; B64D 11/0641;
(Continued)

(56) References Cited

U.S. PATENT DOCUMENTS

| 1,743,149 | A | * | 1/1930 | Lyford | .................. | B62D 47/02 |
| | | | | | | 296/64 |
| 1,948,200 | A | * | 2/1934 | Bromagem | .............. | A47C 7/56 |
| | | | | | | 297/249 |

(Continued)

*Primary Examiner* — Medhat Badawi
(74) *Attorney, Agent, or Firm* — Clements Bernard Walker

(57) ABSTRACT

A four-suite unit positionable in an aircraft cabin to one side of a longitudinal aisle and including first and second suites positioned longitudinally-aligned and facing each other, a shared passageway positioned between foot ends of the first and second suites, third and fourth suites positioned longitudinally-aligned and to one side of the respective first and second suites, a first passageway positioned between a portion of the first suite and a portion of the third suite for accessing the third suite from the shared passageway, and a second passageway positioned between a portion of the second suite and a portion of the fourth suite for accessing the fourth suite from the shared passageway.

7 Claims, 17 Drawing Sheets

Related U.S. Application Data

(60) Provisional application No. 62/234,110, filed on Sep. 29, 2015, provisional application No. 62/234,172, filed on Sep. 29, 2015, provisional application No. 62/234,762, filed on Sep. 30, 2015.

(52) U.S. Cl.
CPC ...... B64D 11/0604 (2014.12); B64D 11/0605 (2014.12); B64D 11/0606 (2014.12); *B64D 2011/0069* (2013.01)

(58) Field of Classification Search
CPC ............ B64D 11/0604; B64D 11/0605; B64D 11/0606; B64D 2011/0069; Y02T 50/46
See application file for complete search history.

(56) References Cited

U.S. PATENT DOCUMENTS

| | | | | |
|---|---|---|---|---|
| 2,046,859 A * | 7/1936 | George | B62D 31/04 | 296/64 |
| 2,382,402 A * | 8/1945 | De Roode | B64D 11/00 | 244/118.6 |
| 2,414,730 A * | 1/1947 | Flogaus | B62D 47/02 | 296/64 |
| 2,557,885 A * | 6/1951 | Murphy | B61D 1/04 | 105/344 |
| 2,583,960 A * | 1/1952 | Murphy | B61D 31/00 | 105/315 |
| 2,608,366 A * | 8/1952 | Jergenson | B60N 2/34 | 244/118.6 |
| 2,947,349 A * | 8/1960 | Kryter | B64D 11/0601 | 297/174 R |
| 4,382,628 A * | 5/1983 | Palmgren | B60N 2/242 | 244/118.6 |
| 4,686,908 A * | 8/1987 | Legrand | B61D 1/02 | 105/315 |
| 4,936,620 A * | 6/1990 | Francois | B64D 11/00 | 105/345 |
| 5,131,607 A * | 7/1992 | Arnold | B64D 11/06 | 244/118.6 |
| 5,265,828 A * | 11/1993 | Bennington | B60N 2/28 | 244/118.6 |
| 5,716,026 A * | 2/1998 | Pascasio | B64D 11/00 | 105/315 |
| 6,003,813 A * | 12/1999 | Wentland | B64D 11/00 | 244/118.5 |
| 6,019,421 A * | 2/2000 | Roh | A47C 29/006 | 297/184.13 |
| 6,209,956 B1 * | 4/2001 | Dryburgh | A47C 1/0352 | 297/245 |
| 6,237,872 B1 * | 5/2001 | Bar-Levav | B64D 11/00 | 105/314 |
| 6,648,407 B1 * | 11/2003 | Michel | B64D 11/06 | 297/111 |
| 6,913,227 B1 * | 7/2005 | Mahmulyin | B64D 11/06 | 244/118.5 |
| 7,025,306 B2 * | 4/2006 | Saint Jalmes | B64D 11/00 | 244/118.6 |
| 7,168,658 B2 * | 1/2007 | Mercier | B64D 11/06 | 244/118.6 |
| 7,395,989 B2 * | 7/2008 | Saint-Jalmes | B64D 11/00 | 244/118.1 |
| 7,419,214 B2 * | 9/2008 | Plant | B60N 2/34 | 244/118.6 |
| D580,846 S * | 11/2008 | Bladt | D12/345 | |
| 7,721,991 B2 * | 5/2010 | Johnson | B64D 11/06 | 244/118.6 |
| 8,118,365 B2 * | 2/2012 | Henshaw | B60N 2/242 | 297/245 |
| 8,534,604 B2 * | 9/2013 | Savian | B64D 11/003 | 244/118.6 |
| 9,162,766 B2 * | 10/2015 | Saint-Jalmes | B64D 11/06 | |
| 9,315,270 B2 * | 4/2016 | Dryburgh | B64D 11/06 | |
| 9,409,648 B2 * | 8/2016 | Eakins | B64D 11/06 | |
| 9,856,025 B2 * | 1/2018 | Jasny | B60N 2/995 | |
| 9,889,936 B2 * | 2/2018 | Campbell | B64D 11/06 | |
| 2002/0038966 A1 * | 4/2002 | Doehrer | B60N 2/00 | 297/216.16 |
| 2002/0070314 A1 * | 6/2002 | Schmidt-Schaeffer | B60N 2/01 | 244/118.6 |
| 2003/0029967 A1 * | 2/2003 | Mills | B64D 11/00 | 244/118.5 |
| 2005/0001097 A1 * | 1/2005 | Saint-Jalmes | B64D 11/00 | 244/118.6 |
| 2005/0001098 A1 * | 1/2005 | Saint-Jalmes | B64D 11/00 | 244/118.6 |
| 2005/0067870 A1 * | 3/2005 | Rezag | B64D 11/06 | 297/354.13 |
| 2005/0087650 A1 * | 4/2005 | Quan | B64D 11/06 | 244/118.6 |
| 2005/0189451 A1 * | 9/2005 | Mercier | B64D 11/00 | 244/118.6 |
| 2006/0097553 A1 * | 5/2006 | Spurlock | B64D 11/06 | 297/248 |
| 2006/0237585 A1 * | 10/2006 | Lau | B64D 11/00 | 244/118.5 |
| 2011/0101161 A1 * | 5/2011 | Saint-Jalmes | B64D 11/06 | 244/118.6 |
| 2012/0146372 A1 * | 6/2012 | Ferry | B64D 11/06 | 297/232 |
| 2012/0223186 A1 * | 9/2012 | Henshaw | B64D 11/06 | 244/118.6 |
| 2012/0223557 A1 | 9/2012 | Henshaw | | |
| 2012/0298798 A1 | 11/2012 | Henshaw et al. | | |
| 2013/0106156 A1 * | 5/2013 | Orson | B64D 11/06 | 297/217.3 |
| 2013/0241246 A1 * | 9/2013 | Round | B64D 11/06 | 297/63 |
| 2013/0248653 A1 * | 9/2013 | Round | B64D 11/06 | 244/118.6 |
| 2014/0035330 A1 * | 2/2014 | Henshaw | B60N 3/002 | 297/174 R |
| 2014/0306500 A1 * | 10/2014 | Dryburgh | B64D 11/06 | 297/232 |
| 2014/0361585 A1 * | 12/2014 | Henshaw | B60N 2/01 | 297/174 R |
| 2015/0136904 A1 * | 5/2015 | Savard | B64D 11/06 | 244/118.6 |
| 2015/0210393 A1 * | 7/2015 | Savian | B64D 11/0601 | 244/118.6 |
| 2016/0016667 A1 * | 1/2016 | Schmidt-Schaffer | B64D 11/0627 | 244/118.6 |
| 2017/0088267 A1 * | 3/2017 | Dowty | B64D 11/00153 | |
| 2017/0240283 A1 * | 8/2017 | Dowty | B64D 11/0604 | |
| 2017/0259921 A1 * | 9/2017 | Valdes De La Garza | B64D 11/0638 | |

* cited by examiner

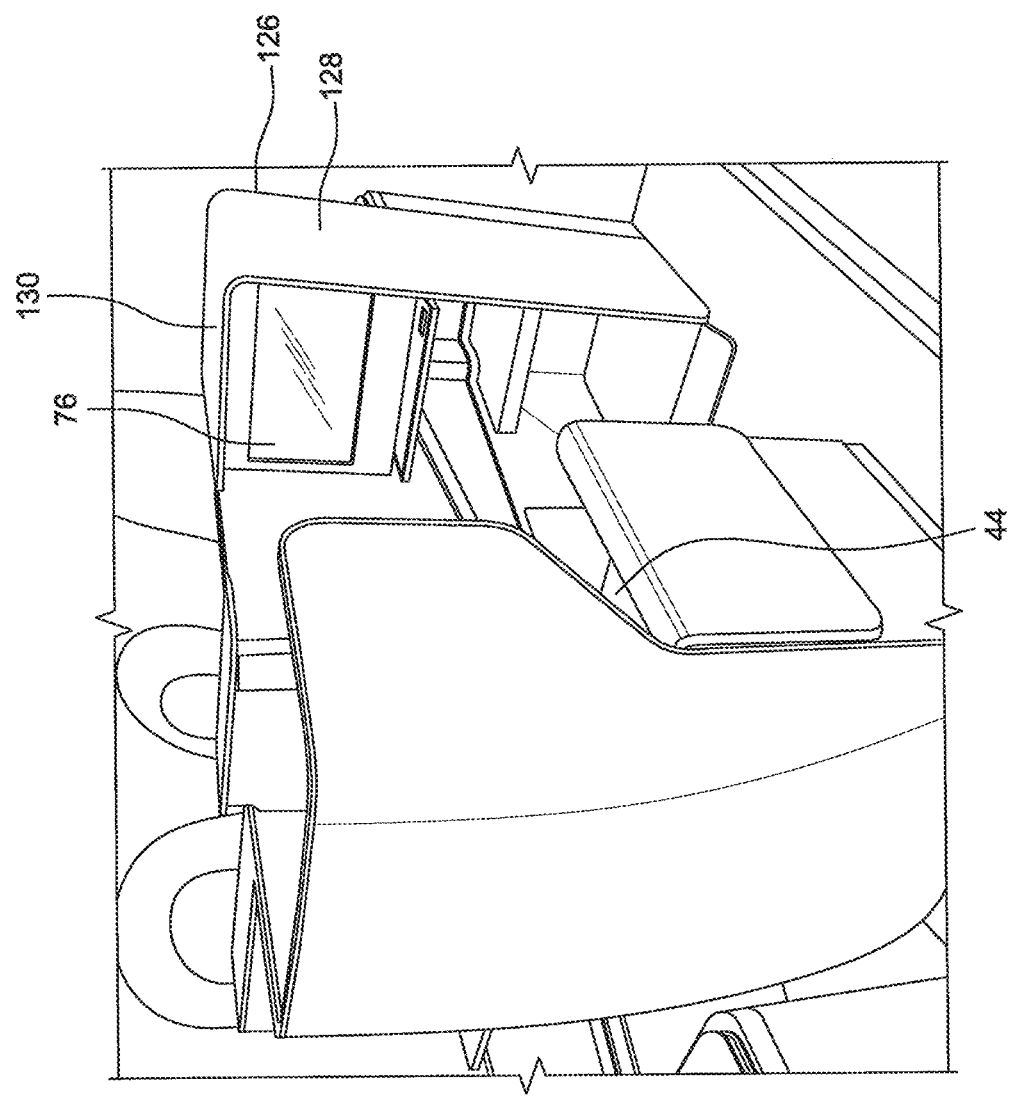

AIRLINER PASSENGER SUITE SEATING ARRANGEMENTS WITH SHARED AISLE SUITE ACCESS

TECHNICAL FIELD AND BACKGROUND OF THE INVENTION

The present invention relates generally to individual passenger suite seating arrangements for airliners and other conveyances, and more particularly, to passenger suites arranged into groups and columns with shared lateral and branch aisles for accessing suites located apart from longitudinal aisles, as well as features and amenities associated with suite groupings and individual suites.

Premium seating classes on long-haul international flights can include individual passenger suites equipped with lay-flat capable seats, ottomans, audio/video equipment and deployable tables, among other amenities. Such suites can be found on wide-body jets where more space is available for accommodating the travel preferences of premium class passengers who can afford to pay higher fares for more space, privacy, conveniences, and luxuries.

As with all seating classes, there is a need to arrange suites on airliners to maximize suite density without compromising seat space and privacy. On current wide-body jets, suites can be arranged into a center column and outboard columns, with suite access provided directly from one of the longitudinal aisles that run from front to rear of the aircraft. As such, each suite is required to be positioned adjacent one of these longitudinal aisles, or access to an outboard suite provided through an adjacent inboard suite, disadvantageously interrupting the privacy of the passenger seated in the inboard suite. Such arrangements also limit the number of suites that can be positioned abreast and/or requires the suites to be positioned at an angle to the longitudinal axis of the aircraft.

Accordingly, what is needed are seating arrangements for individual suites that allow a greater number of suites to be positioned abreast, thereby allowing all suites to extend in the longitudinal direction while maximizing suite privacy, among other advantages.

SUMMARY OF INVENTIVE ASPECTS

It is therefore an object of the invention to provide passenger seating arrangements for passenger airliners and other conveyances.

It is another object of the invention to provide seating arrangements including a plurality of individual passenger suites, each of which can be equipped with a lay-flat seat and other amenities.

It is a further object of the invention to provide seating arrangements in which suites are arranged into columns, such as a center column and outboard columns.

It is a further object of the invention to arrange suites within columns such that outboard suites spaced apart from the longitudinal aisles can be accessed through shared lateral aisles without disturbing passengers occupying inboard suites located adjacent the longitudinal aisles.

It is a further object of the invention to arrange suites and lateral aisles such that a single lateral aisle can be used to gain access to two outboard suites lacking direct access to a longitudinal aisle.

It is a further object of the invention to provide a seating arrangement including longitudinal aisles, lateral aisles branching off of the longitudinal aisles, and branch aisles branching off of the lateral aisles.

It is a further object of the invention to provide suite arrangements in which each individual suite is equipped with premium class features and amenities and is configured for maximum privacy.

To achieve the foregoing and other objects and advantages, the inventive aspects disclosed herein are directed to a four-suite unit positionable in an aircraft cabin to one side of a longitudinal aisle, the four-suite unit including first and second suites positioned longitudinally-aligned and facing each other, a shared passageway positioned between foot ends of the first and second suites, third and fourth suites positioned longitudinally-aligned and to one side of the respective first and second suites, a first passageway positioned between a portion of the first suite and a portion of the third suite for accessing the third suite from the shared passageway, and a second passageway positioned between a portion of the second suite and a portion of the fourth suite for accessing the fourth suite from the shared passageway.

In some embodiments, each of the first, second, third and fourth suites may include a passenger seat convertible from an upright sitting position to a lay-flat bed.

In some embodiments, each of the first, second, third and fourth suites may include a footwell spaced forward of a forward end of the passenger seat.

In some embodiments, each of the each of the first, second, third and fourth suites may include an ottoman positioned forward of a forward end of the passenger seat.

In some embodiments, the four-suite unit may include a shared privacy wall dividing the first and third suites.

In some embodiments, the four-suite unit may include a shared privacy wall dividing the second and fourth suites.

In some embodiments, the four-suite unit may include a shared privacy wall dividing the third and fourth suites.

In some embodiments, the third and fourth suites may face each other.

In some embodiments, each of the first and second suites may include a sliding door.

The inventive aspects disclosed herein are further directed to a suite array for an aircraft cabin including a four-suite unit positioned to one side of a longitudinal aisle, the four-suite unit including first and second suites positioned longitudinally-aligned, facing each other, and directly adjacent to and accessible from the longitudinal aisle, a shared passageway positioned between foot ends of the first and second suites and accessible from the longitudinal aisle, third and fourth suites positioned longitudinally-aligned and to one side of the respective first and second suites opposite the longitudinal aisle, a first passageway positioned between a portion of the first suite and a portion of the third suite for accessing the third suite from the longitudinal aisle via the shared passageway, and a second passageway positioned between a portion of the second suite and a portion of the fourth suite for accessing the fourth suite from the longitudinal aisle via the shared passageway.

The inventive aspects disclosed herein are further directed to a suite layout for an aircraft cabin including a longitudinal aisle and first and second four-suite units positioned on opposite sides of the longitudinal aisle. Each of the first and second four-suite units includes first and second suites positioned longitudinally-aligned, facing each other, and directly adjacent to and accessible from the longitudinal aisle, a shared passageway positioned between foot ends of the first and second suites and accessible from the longitudinal aisle, third and fourth suites positioned longitudinally-aligned and to one side of the respective first and second suites opposite the longitudinal aisle, a first passageway positioned between a portion of the first suite and a portion of the third suite for accessing the third suite from the longitudinal aisle via the shared passageway, and a second passageway positioned between a portion of the second suite and a portion of the fourth suite for accessing the fourth suite from the longitudinal aisle via the shared passageway.

In some embodiments, each of the first, second, third and fourth suites includes a passenger seat convertible from an upright sitting position to a lay-flat bed, and an ottoman positioned in a footwell spaced forward of a forward end of the passenger seat.

In some embodiments, the suite layout may further include a first shared privacy wall dividing the first and third suites, a second shared privacy wall dividing the second and fourth suites, and a third shared privacy wall dividing the third and fourth suites.

In some embodiments, at least a portion of at least the first and second shared privacy walls may be retractable.

Embodiments can include one or more or any combination of the above features and configurations.

BRIEF DESCRIPTION OF THE DRAWINGS

Features, aspects and advantages of the present invention are better understood when the following detailed description of the invention is read with reference to the accompanying drawings, in which:

FIG. 15 shows a fabric door for closing off a suite adjacent a longitudinal aisle.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Each passenger suite shown in drawings and described herein is elongate and therefore defines a longitudinal suite axis and a lateral suite axis. The longitudinal suite axis of each suite can be oriented parallel to, or near parallel to, a longitudinal axis of the airliner, such that all seats within the suites can be either forward facing or rearward facing. Flight attendant and galley components can be located immediately forward and/or rearward of the columns of suites. Although the seating arrangements disclosed herein show six suites arranged abreast, alternate seating configurations are envisioned depending on the width of the aircraft, among other factors.

Figure 1:
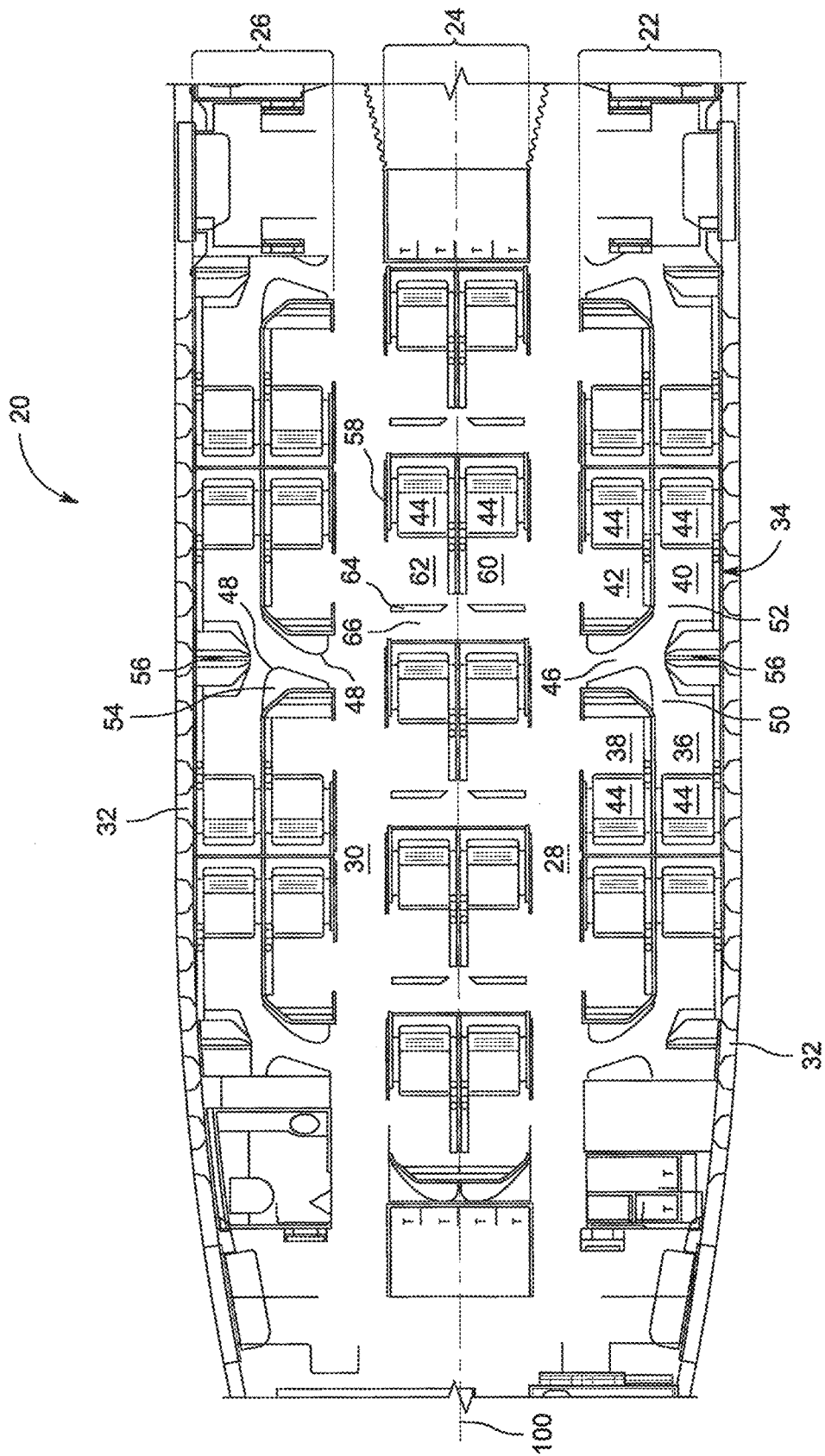
FIG. 1 is a plan view of an airliner passenger suite seating arrangement according to an embodiment of the invention.
Figure 2:
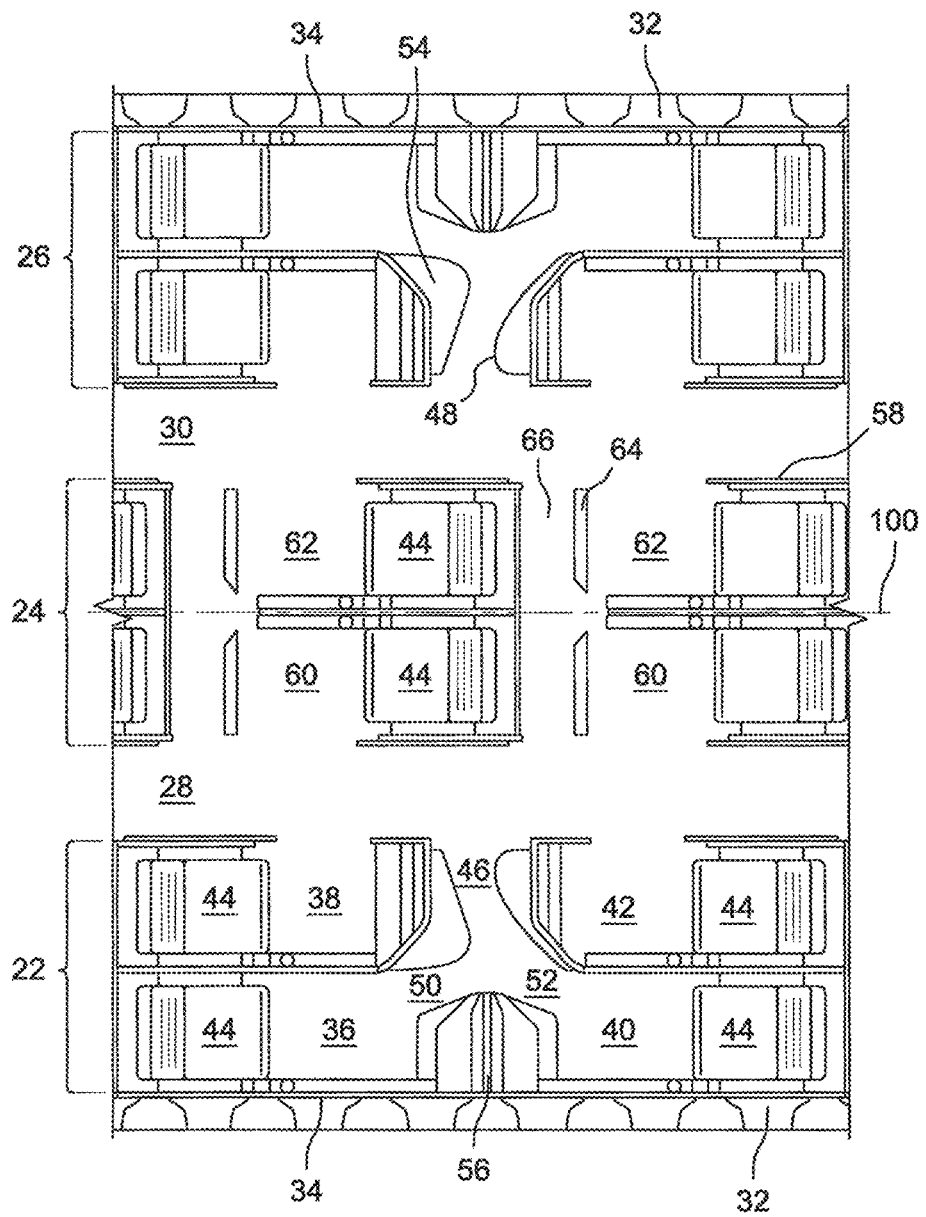
FIG. 2 shows a portion of the seating arrangement of FIG. 1.

FIGS. 1 and 2 show a first passenger seating arrangement 20 according to an embodiment of the invention. The first seating arrangement 20 generally includes passenger suites arranged in a first outboard column 22 (e.g., port side), a center column 24, and a second outboard column 26 (e.g., starboard side). A first longitudinal aisle 28 is located between the first outboard column 22 and the center column 24. A second longitudinal aisle 30 is located between the center column 24 and the second outboard column 26. The first and second outboard columns 22, 26 can be located against or adjacent a wall 32 of the aircraft fuselage, such that suites adjacent the wall 32 can be configured as window suites, and the suites adjacent one of the longitudinal aisles 28, 30 can be configured as aisle suites. As used herein, the term "longitudinal" means the longitudinal direction of the aircraft (i.e., front to rear), the term "inboard" means adjacent one of the longitudinal aisles 28, 30, and the term "outboard" means apart from one of the longitudinal aisles 28, 30, for example, adjacent the wall 32.

Each of the first outboard column 22, the center column 24, and the second outboard column 26 can be located between galley centers, lavatories, etc. As shown, the first and second outboard columns 22, 26 have similar suite arrangements that differ from the suite arrangement in the center column 24. The seating arrangement, as it concerns the suites in the first outboard column 22, center column 24, and second outboard column 26, is generally symmetrical about a longitudinal centerline of the aircraft indicated at reference numeral 100.

The first and second outboard columns 22, 26 each include one or more first suite groupings 34 each generally including a first suite 36, a second suite 38, a third suite 40, and a fourth suite 42, each comprising a lay-flat seat 44 extending in a longitudinal direction of the aircraft. The lay-flat seats 44 in the first and second suites 36, 38 can be arranged laterally adjacent one another and can face, for example, a rear of the aircraft. The lay-flat seats 44 in the third and fourth suites 40, 42 can be arranged laterally adjacent one another and can face a front of the aircraft, for example. The seats 44 in the first and third suites 36, 40 can be longitudinally aligned such that the seat 44 of the first suite 36 faces directly into the seat 44 of the third suite 40, although the suites are divided by partition walls as discussed below.

The second and fourth suites 38, 42 of each first suite grouping 34 are spaced apart in the longitudinal direction such that a lateral aisle 46 is provided therebetween. Each lateral aisle 46 is accessible from one of the two longitudinal aisles 28, 30 of the aircraft. Each lateral aisle 46 is located between the foot ends 48 of its respective second and fourth suites 38, 42, and provides access to the outboard first and third suites 36, 38. Thus, each lateral aisle 46 is shared by two passengers to each access their respective outboard suite.

First and second branch aisles 50, 52 branch from each lateral aisle 46 at the end of the lateral aisle 46 opposite one of the longitudinal aisles 28, 30. The first branch aisle 50 provides passage from its respective lateral aisle 46 to the first suite 36. The second branch aisle 52 provides passage from its respective lateral aisle 46 to the third suite 40. Thus, while the lateral aisle 46 is shared for accessing both the first and third suites 36, 40, each branch aisle 50, 52 accesses only one of the first and third suites 36, 40. In this arrangement, the first suite 36 is accessed by way of one of the longitudinal aisles 28, 30, a lateral aisle 46, and a first branch aisle 50. The third suite 40 is accessed by way of one of the longitudinal aisles 28, 30, a lateral aisle 46, and a second branch aisle 52. In this arrangement, the first and third suites 36, 40 can be accessed without passing through and disturbing the second and fourth suites 38, 42.

Each lateral aisle 46 can be oriented perpendicular to its respective one of the longitudinal aisles 28, 30. Preferably, each lateral aisle 46 is oriented at a non-orthogonal angle to its respective one of the longitudinal aisles 28, 30. The lateral aisles 46 can be oriented at a shallow angle to achieve an at least approximately 198 centimeter (i.e., 78 inch) suite length in each of the second and fourth suites 38, 42 to allow full seat recline to a flat bed. Maximum suite length can be measured from a suite wall behind the seat 44 to a farthest point therefrom at the foot end 48.

The foot ends 48 can be covered with a rounded or curved shroud 54 that covers a footwell. Opposite tapers of the spaced, opposing foot ends 48 of the second and fourth suites 38, 42 allow the angled lateral aisle 46 therebetween and achieve the minimum suite length requirement in a shorter length as compared to a suite arrangement having an orthogonal lateral aisle orientation. The second and fourth suites 38, 42 have substantially equivalent lengths as measured from the wall behind the seat 44 to the farthest point of the foot end 48. All four suites 36, 38, 40 and 42 can have the same length. Alternatively, a total longitudinal length of the first suite 36 can be greater than a total longitudinal length of the second suite 38, and a total longitudinal length of the third suite 40 can be greater than a total longitudinal length of the fourth suite 42.

The first and third suites 36, 40 are separated by a partition 56 that divides the suites and enhances privacy. A first side of the partition 56 can be configured with at least one of a video monitor, a desk, a deployable table, and an ottoman presented for use by a passenger in the first suite 36. A second or opposite side of the partition 56 can be configured with at least one of a video monitor, a desk, a deployable table, and an ottoman presented for use by a passenger in the third suite 40. The second and fourth suites 38, 42 can also include at least one of a video monitor, a desk, a deployable table, and an ottoman positioned forward of their respective seat 44.

As further shown in FIGS. 1 and 2, the center column 24 can include a plurality of second suite groupings 58 each including a fifth suite 60 and a sixth suite 62. The fifth and sixth suites 60, 62 can both be forward facing or both rear facing, and are generally symmetrical about the centerline 100. Each of the fifth and sixth suites 60, 62 includes a lay-flat seat 44 and a partition 64 spaced forward of the seat 44. The partition 64 can serve as a mounting location for at least one of a desk, video monitor, deployable table, etc. Lateral aisles 66 are located forward of the partitions 64 (i.e., between the partitions 64 and the back of a "forward" suite) and provide access from one of the longitudinal aisles 28, 30 to the other of the longitudinal aisles 28, 30 without disturbing the occupants of the fifth and sixth suites 60, 62.

Although the second suite grouping 58 is shown in the center column 24, at least one of the first outboard column 22, center column 24, and second outboard column 26 can include a second suite grouping 58. In any suite grouping arrangement, each of the first outboard column 22, center column 24, and second outboard column 26 include a plurality of one of the suite groupings disclosed herein.

Figure 3:
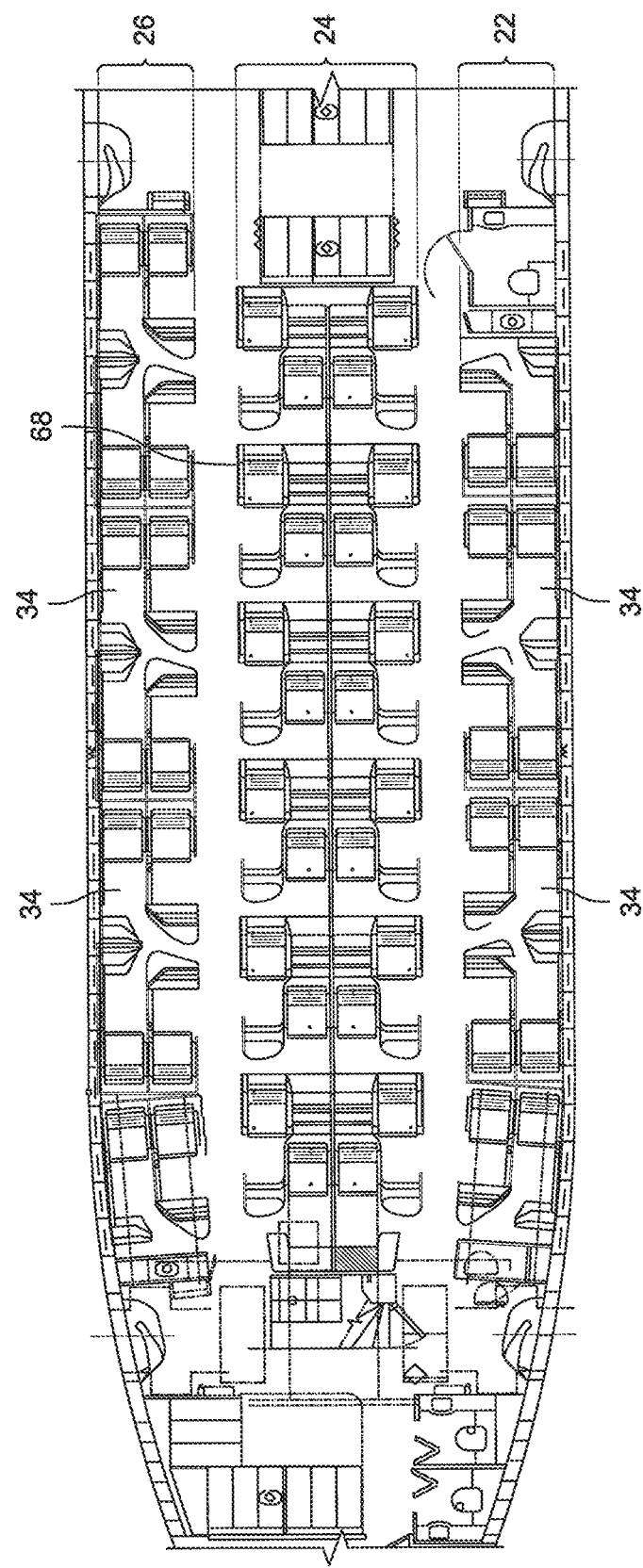
FIG. 3 is a plan view of an airliner passenger suite seating arrangement according to another embodiment of the invention.
Figure 4:
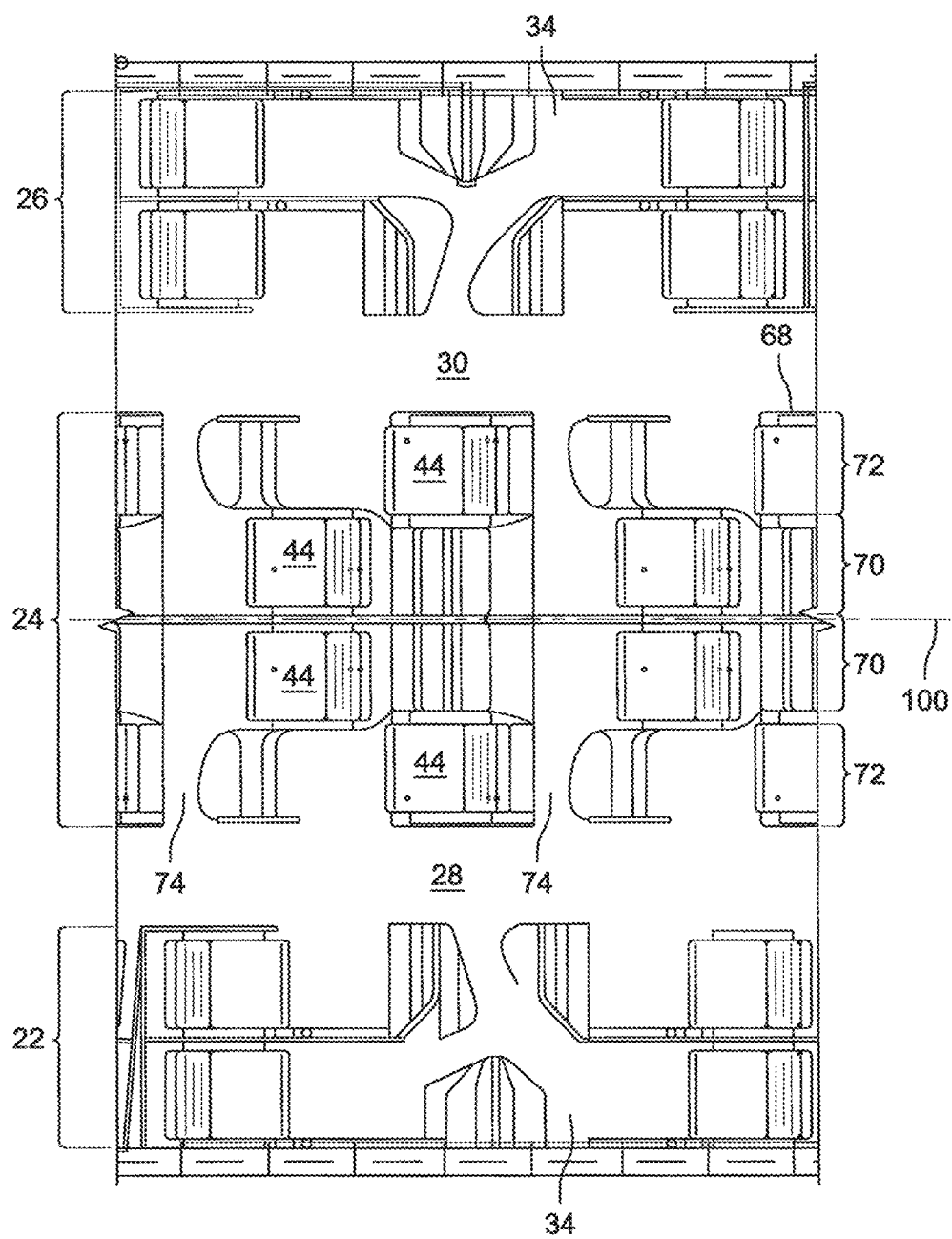
FIG. 4 shows a portion of the seating arrangement of FIG. 3.

FIGS. 3 and 4 shows first suite groupings 34 in the first and second outboard columns 22, 26, and a center column 24 including a plurality of alternative second suite groupings 68. The alternative second suite groupings 68 include laterally adjacent and longitudinally shifted first and second columns 70, 72 of suites. The first column 70 includes longitudinally adjacent suites each including a lay-flat seat 44 extending in a longitudinal direction of the airliner, and the second column 72 includes spaced longitudinally adjacent suites each including a lay-flat seat 44 extending in a longitudinal direction of the airliner. A lateral aisle 74 is provided between each of adjacent ones of the suites in the second column 72 for accessing a single one of the suites of the first column 70 from one of the first and second longitudinal aisles 28, 30, or another onboard suite located across the centerline 100. In the arrangement shown, the first and second columns 70, 72 are symmetrical about the centerline 100, thus allowing access to either laterally adjacent inboard suite from either one of the longitudinal aisles 28, 30.

Figure 5:
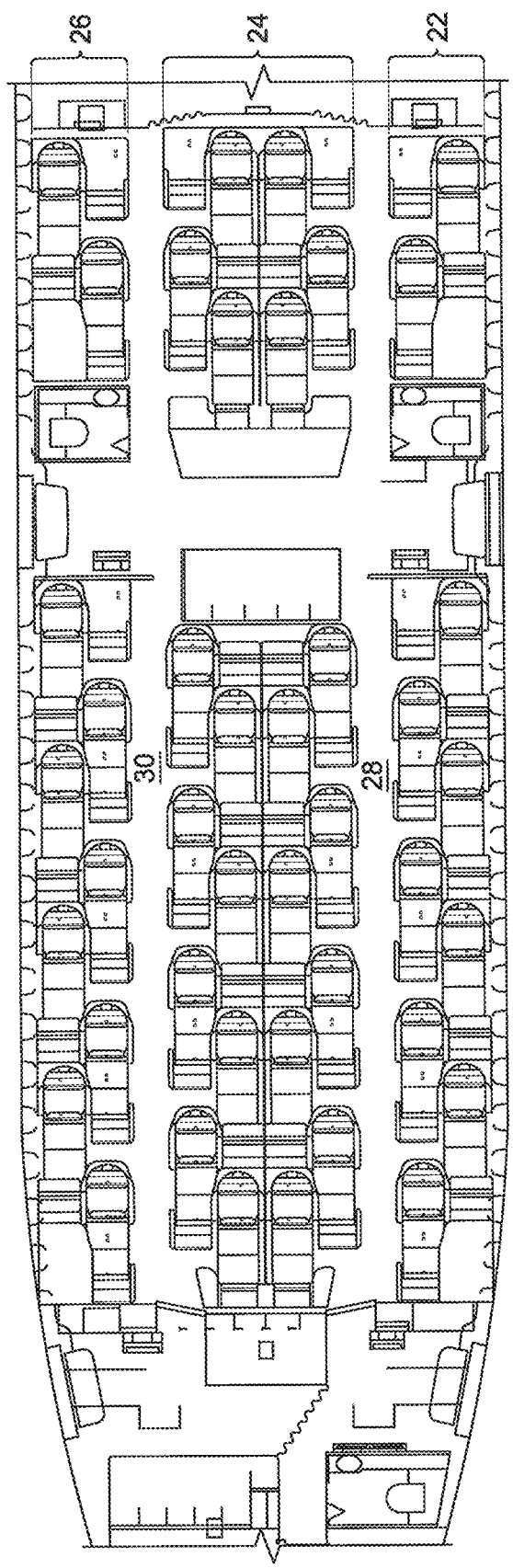
FIG. 5 is a plan view of an airliner passenger suite seating arrangement according to another embodiment of the invention.
Figure 6:
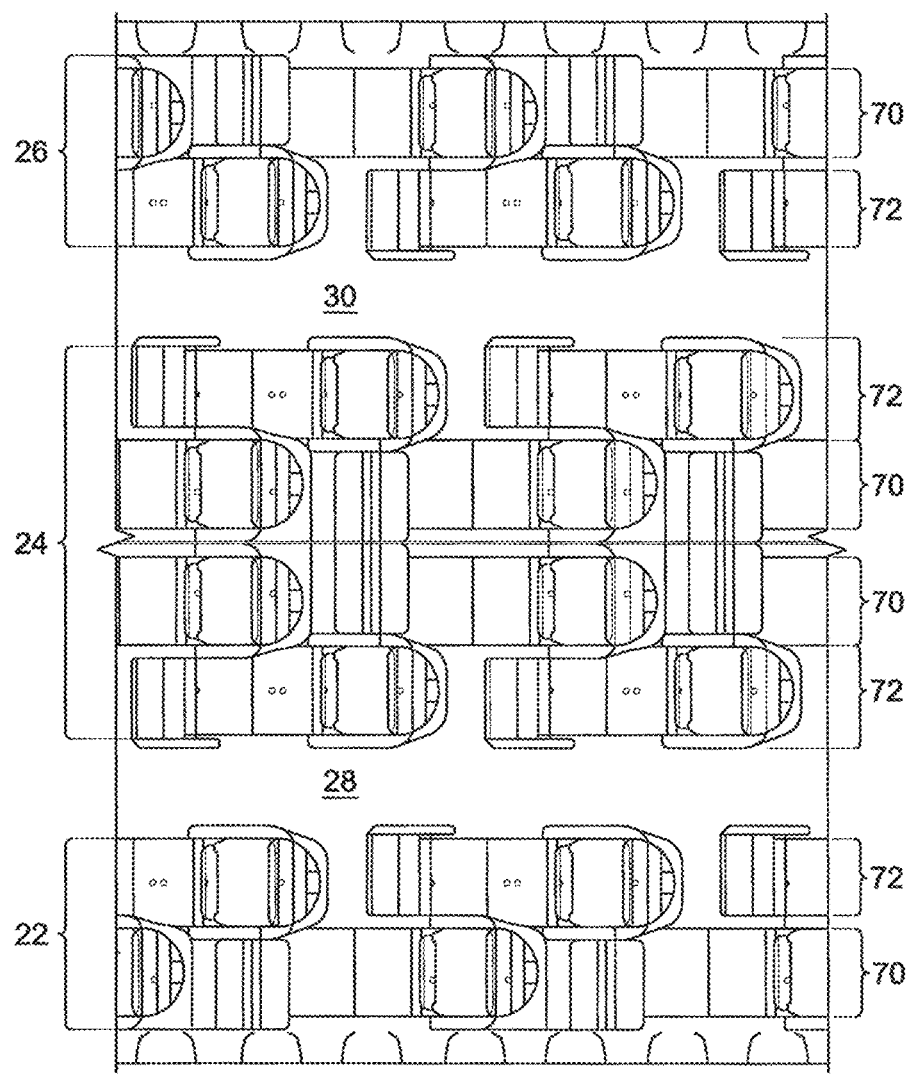
FIG. 6 shows a portion of the seating arrangement of FIG. 5.

FIGS. 5 and 6 show a seating arrangement according to third embodiment of the invention. The seating arrangement shown includes a plurality of suites again arranged into a first outboard column 22, a center column 24, and a second outboard column 26. Each of the first and second outboard columns 22, 26 includes two laterally adjacent first and second columns 70, 72. The center column 24 includes four laterally adjacent columns in the order of, from port-to-starboard, a second column 72, a first column 70, a first column 70, and a second column 72. The seating arrangement also includes first and second longitudinal aisles 28, 30.

Figure 7:
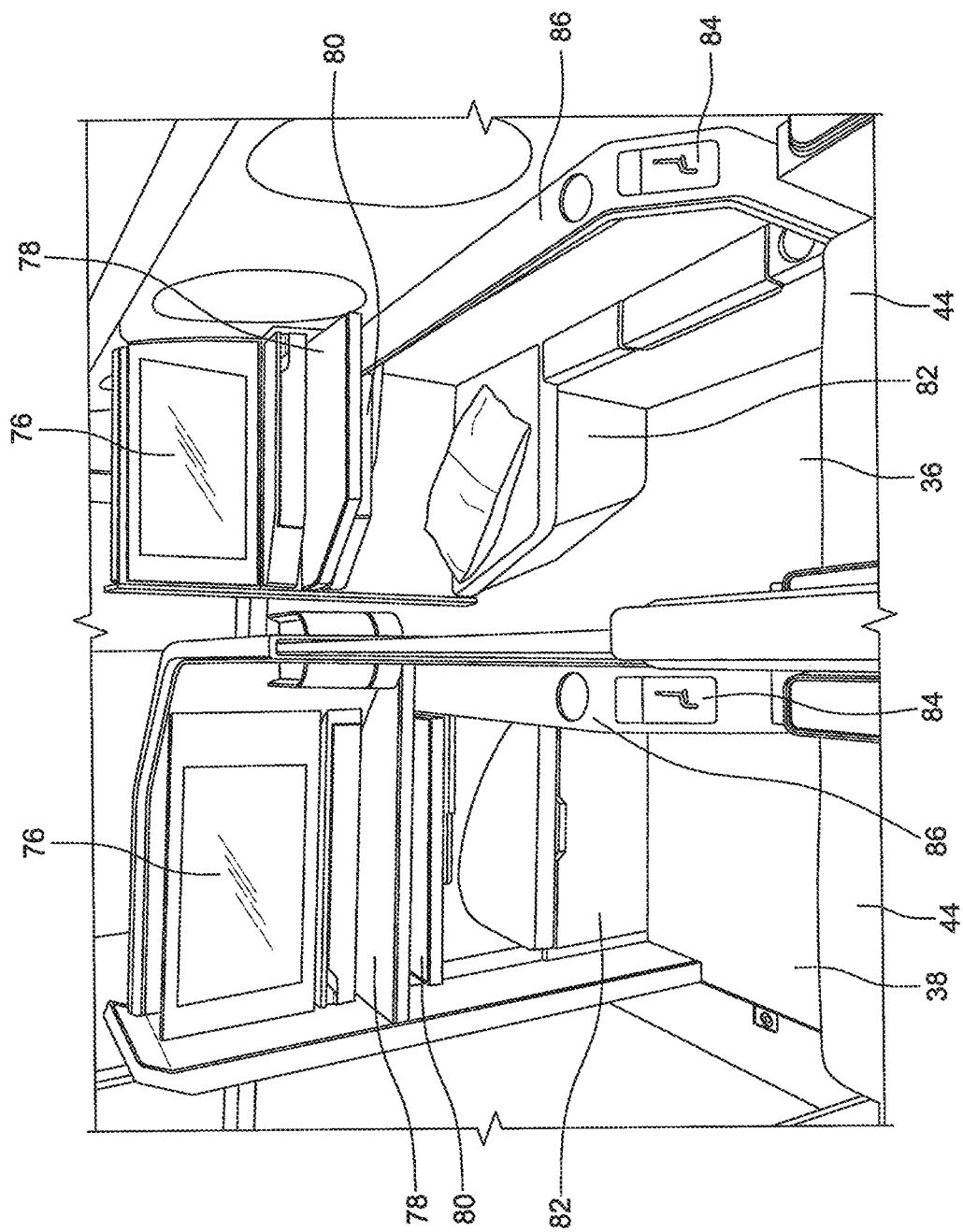
FIG. 7 is a perspective view of a portion suite grouping.

FIG. 7 shows a perspective view from within the first and second suites 36, 38, wherein the first suite 36 is configured as a window suite and the second suite 38 is configured as an aisle suite. The seats 44 within these suites are laterally adjacent and aligned. Each of the suites 36, 38 includes a video monitor 76 positioned directly forward of the seat 44, a shelf 78 located below the video monitor 76, a deployable tray table 80 located below the shelf 78, and an ottoman 82 located below the tray table 80. Vacant space is provided between the bottom of the tray table 80 and the top of the ottoman 82. In the case of the second suite 38, the ottoman 82 therein can define a curvature along the backside thereof that follows the curvature of the foot end. Thus, as shown, the ottoman 82 in the second suite 38 is deeper on the "left side" as compared to the "right side" as viewed in the drawing.

Seat controls in the form of a touchscreen controller 84 are incorporated into an angled surface at the end of a horizontal shelf or armrest 86 that runs along the outboard wall of each of the suites 36, 38. The padded ottoman 82 and padding running alongside the outboard wall of the suite can be substantially coplanar with the seating surfaces of the seat 44 when in a flat bed configuration to increase the surface area of the bed. The touchscreen controller interface can display the adjustable seating surfaces and directional arrows indicating directional movements of the adjustable seating surfaces. The display can further include touch keys for moving the seat to an upright sitting position, predetermined reclined sitting position, and lay-flat sleeping position with a single touch. The controller 84 can further display partition controls for raising and lowering a suite dividing partition, as well as other control features.

Figure 8:
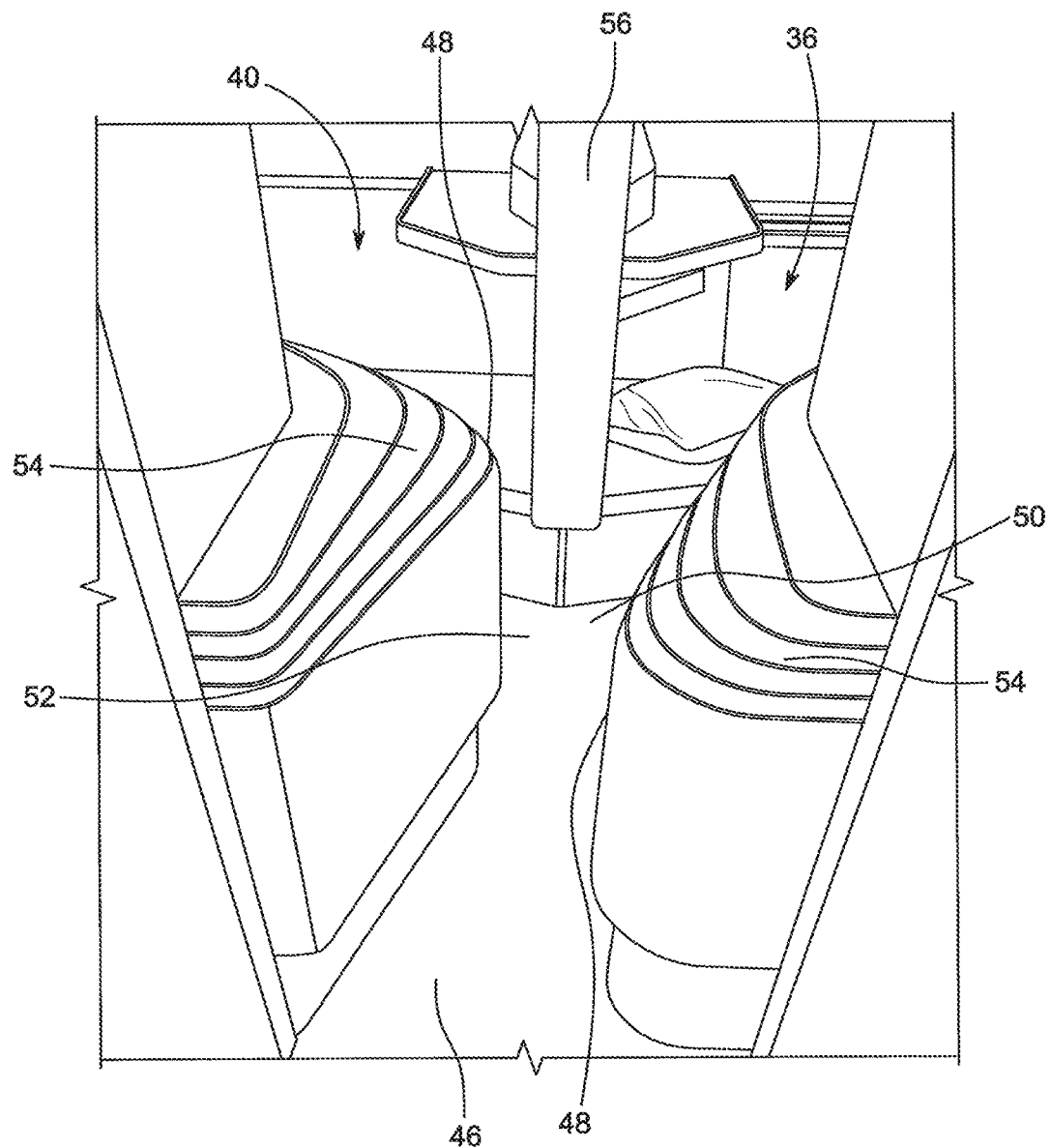
FIG. 8 shows a shared lateral aisle for accessing two longitudinally-adjacent suites.

FIG. 8 shows the angled lateral aisle 46 providing access to the branch aisles 50, 52, and ultimately to the respective first and third suites 36, 40. The foot end 48 of each of the second and fourth suites 38, 42 can be covered with the shroud 54 covering the footwell. The curvature avoids sharp corners and snag hazards, and the opposite tapers allow an angled aisle and minimum seat length required for a bed configuration as discussed above. The partition 56 is also shown dividing the first and third suites 36, 40.

Figure 9A:
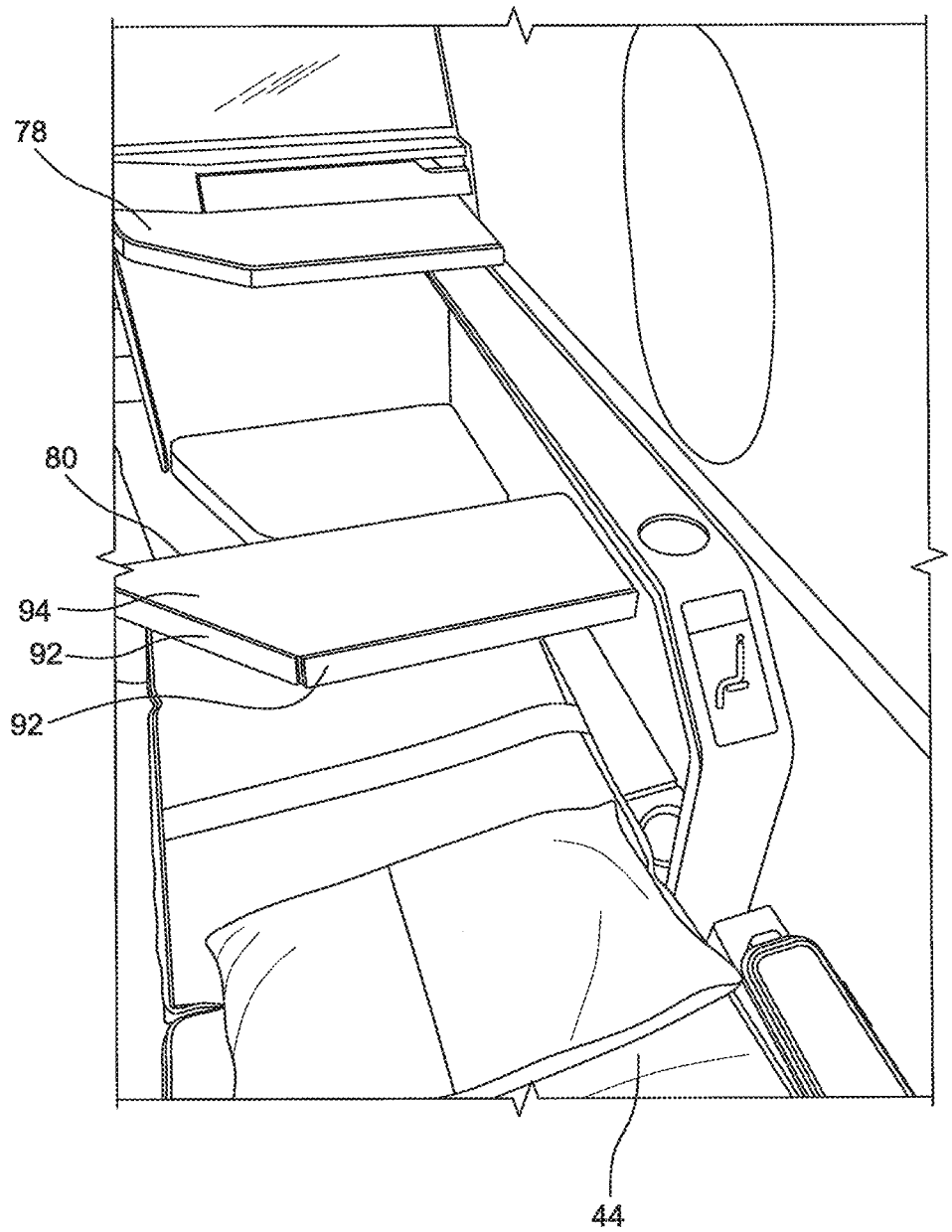
FIG. 9A shows a tray table in a deployed and folded configuration.
Figure 9B:
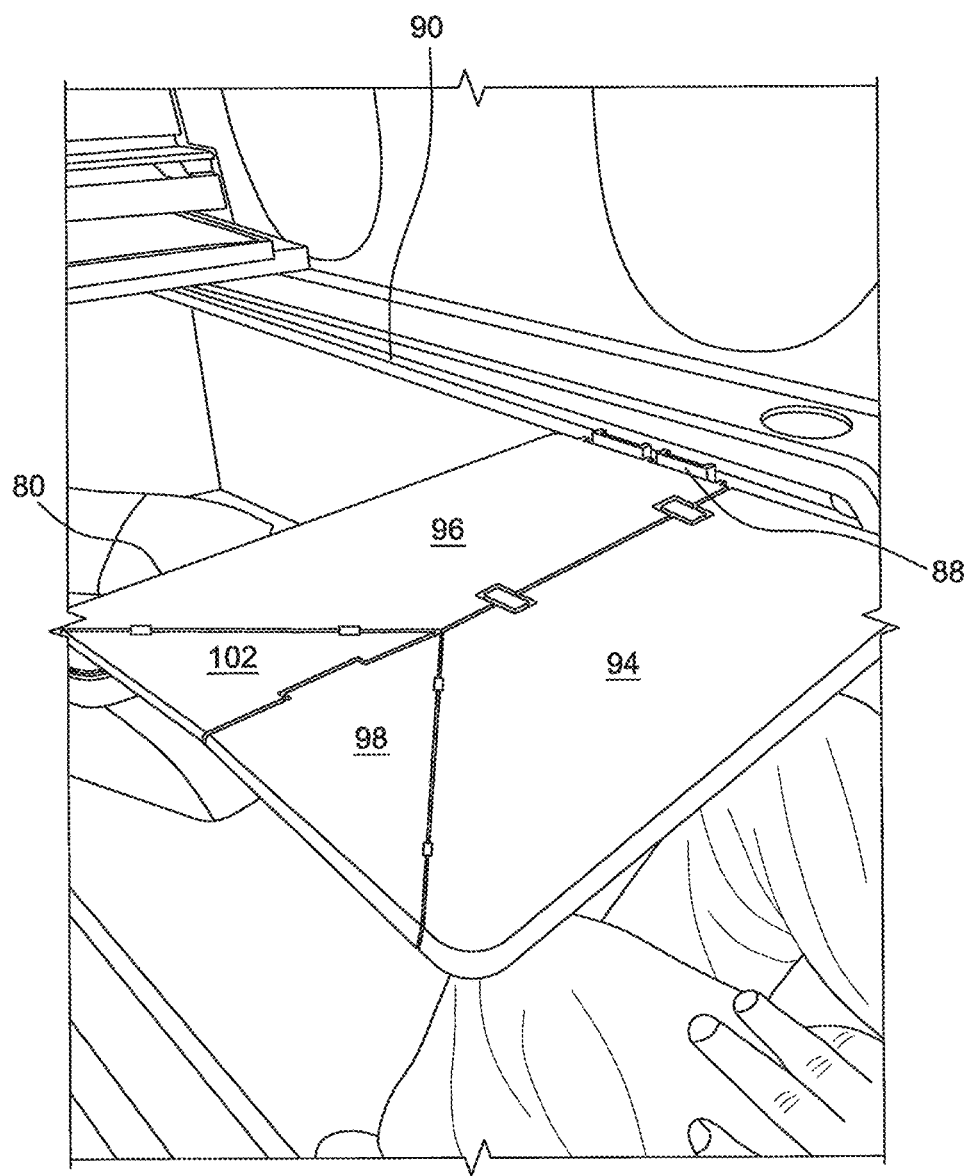
FIG. 9B shows a tray table in a deployed and unfolded configuration.

FIGS. 9A and 9B are perspective views from within the first suite 36 to illustrate deployment and unfolding of the tray table 80. Each of the suites can be equipped with a deployable tray table 80 configured to move between a stowed position below the horizontal shelf 78, and a deployed use position apart from the shelf 78. Deployed use positions can include positions over the seat 44 and positions forward of the seat 44. Tray table 80 is supported on a support arm 88 configured to slide along a horizontal rail 90 that runs along a wall of the suite.

The tray table 80 is cantilevered and horizontally oriented. Close-outs 92 cover gaps between the primary and secondary top and bottom sections of the tray table 80, with the primary top section indicated at 94, the primary bottom section at 96, the secondary top section at 98, and the secondary top section at 102. The close-outs 92 can be hinged to their respective primary and secondary top and bottom sections such that movement of one section relative to another section causes the close-out hinges therebetween to move to permit section movement. The close-outs 92 advantageously conceal pinch points and provide aesthetic coverings for the gaps when the tray table 80 is in a folded configuration.

FIG. 9A shows the tray table 80 deployed and folded, whereby the close-outs 92 conceal the gaps between tray table sections. FIG. 9B shows the tray table 80 unfolded and in an over-seat position. Primary top section 94 is hinged to primary bottom section 96, while secondary top section 98 is hinged to primary top section 94 and secondary bottom section 102, and secondary bottom section 102 is hinged to primary bottom section 96. Pivoting the primary top section 94 apart from the primary bottom section 96 causes secondary top and bottom sections 98, 102 to pivot relative to each other to open the tray table 80 to form a larger horizontal tray table. The tray table 80 can be folded and unfolded as needed depending on the amount of surface area needed. They ability of the tray table 80 to slide forward horizontally to a position forward of the seat 44 allows seat egress without having to stow the tray table 80 and items thereon.

Figure 10:
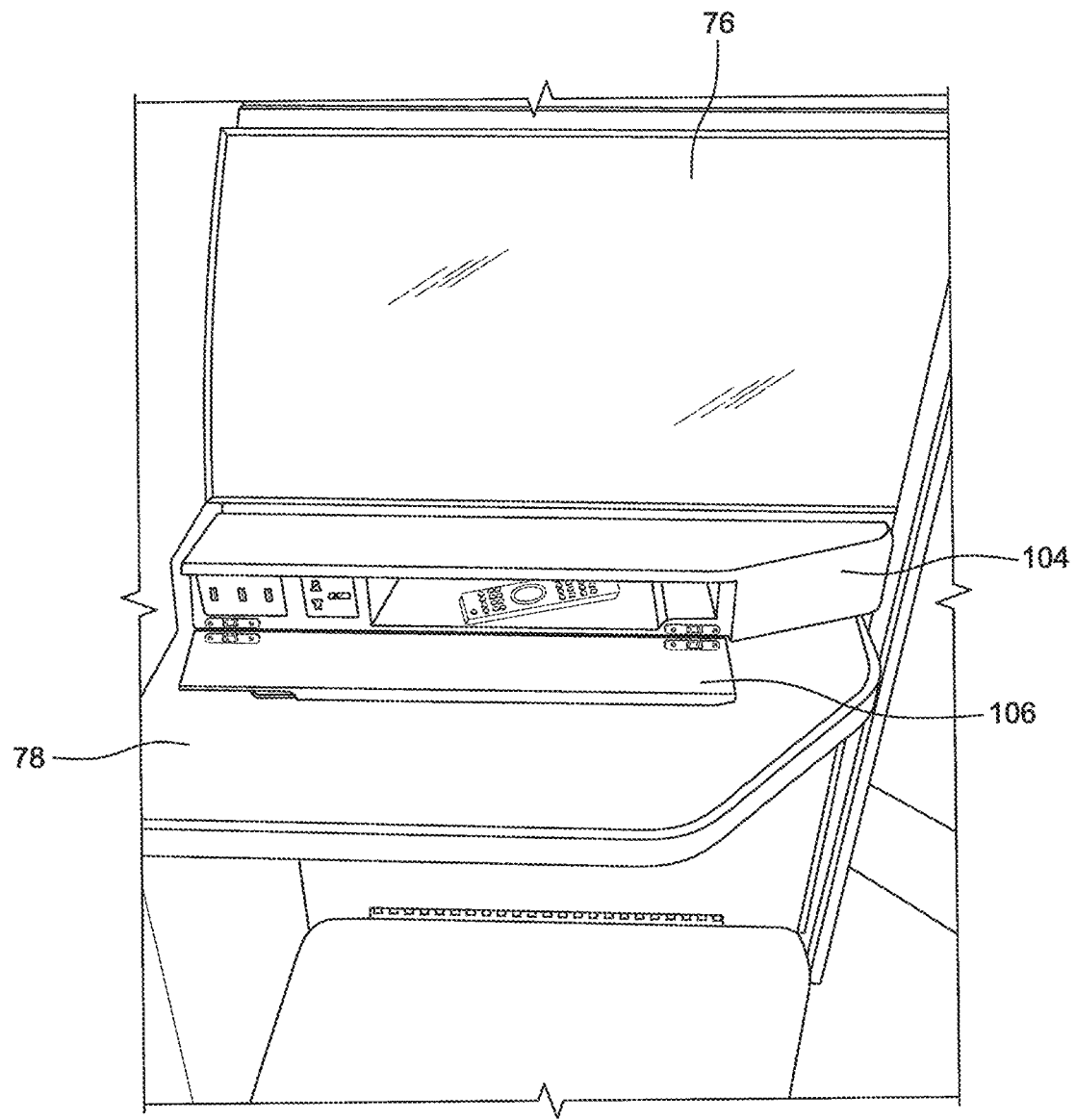
FIG. 10 shows a video monitor located above a desk.

FIG. 10 shows a storage compartment 104 that can be located in space between the video monitor 76 and the shelf 78. The storage compartment 104 can have a hinged door 106, wherein a top edge pivots downward to open as shown. The storage compartment 104 can be used to house power and data connections, as well as include a compartment for storing a remote control and other items.

Figure 11A:
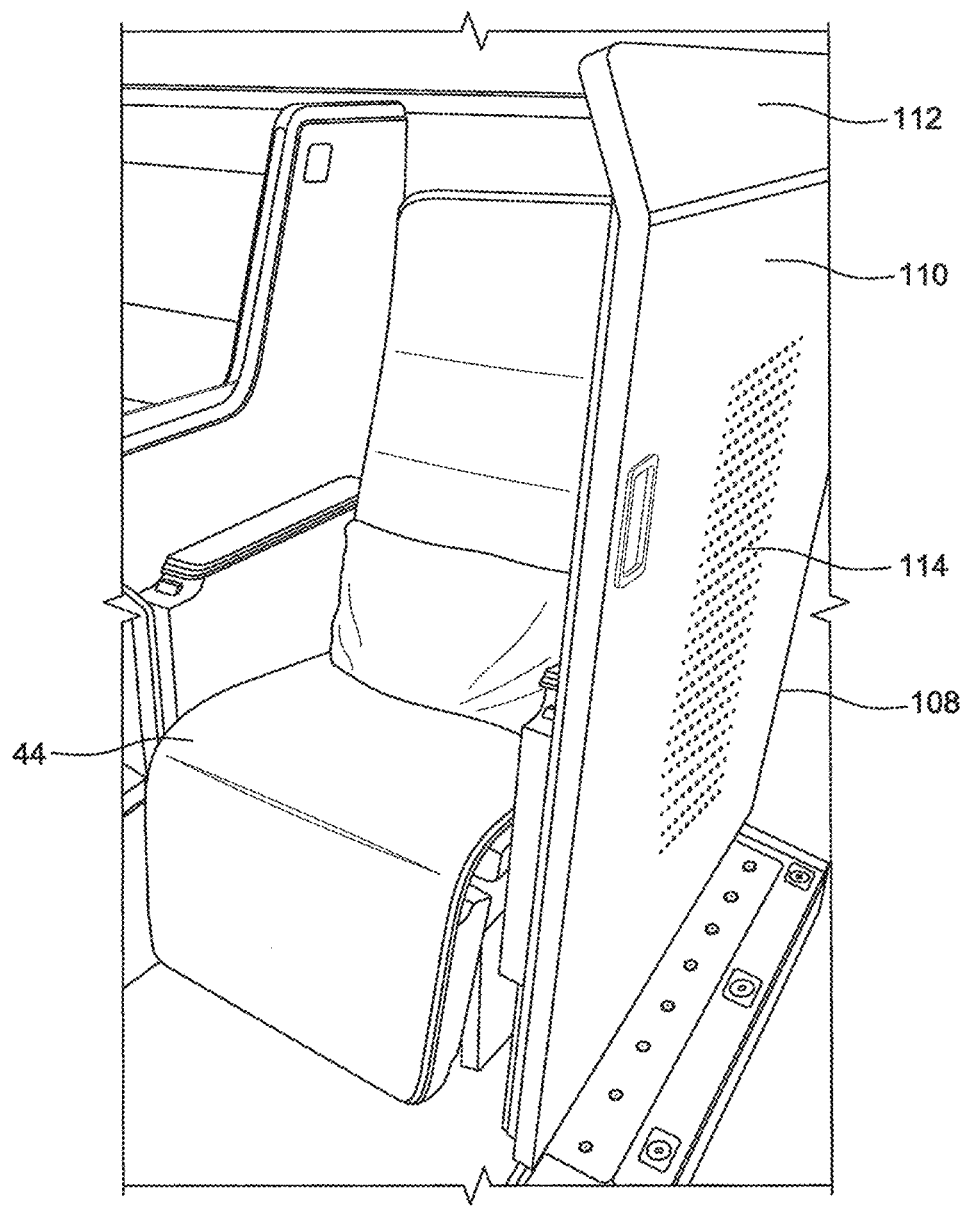
FIG. 11A shows a sliding door of a suite adjacent a longitudinal aisle.
Figure 11B:
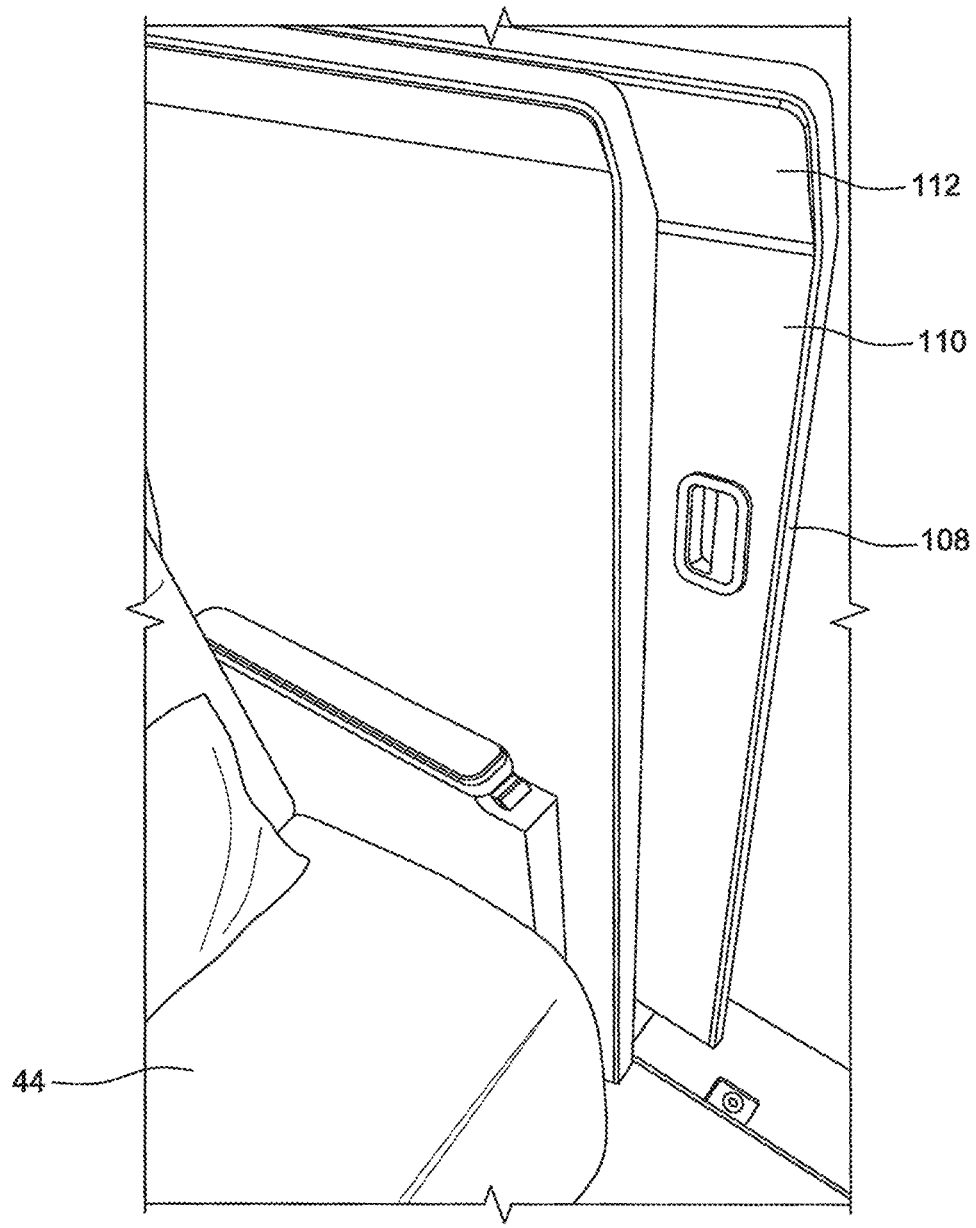
FIG. 11B shows the door from inside the suite.

FIGS. 11A and 11B show a movable door 108 associated with one of the second and fourth suites 38, 42. The door 108 can be configured to slide horizontally along a floor track to open and close. The door 108 includes a vertical portion 110 that extends to about the top of the seatback of the seat 44, and an angled or canted top 112 that angles inward away from the aisle. The angled top 112 enhances privacy in both the open and closed positions of the door. The door 108 can include a front hole pattern 114 that allows internal illumination to shine through.

Figure 12:
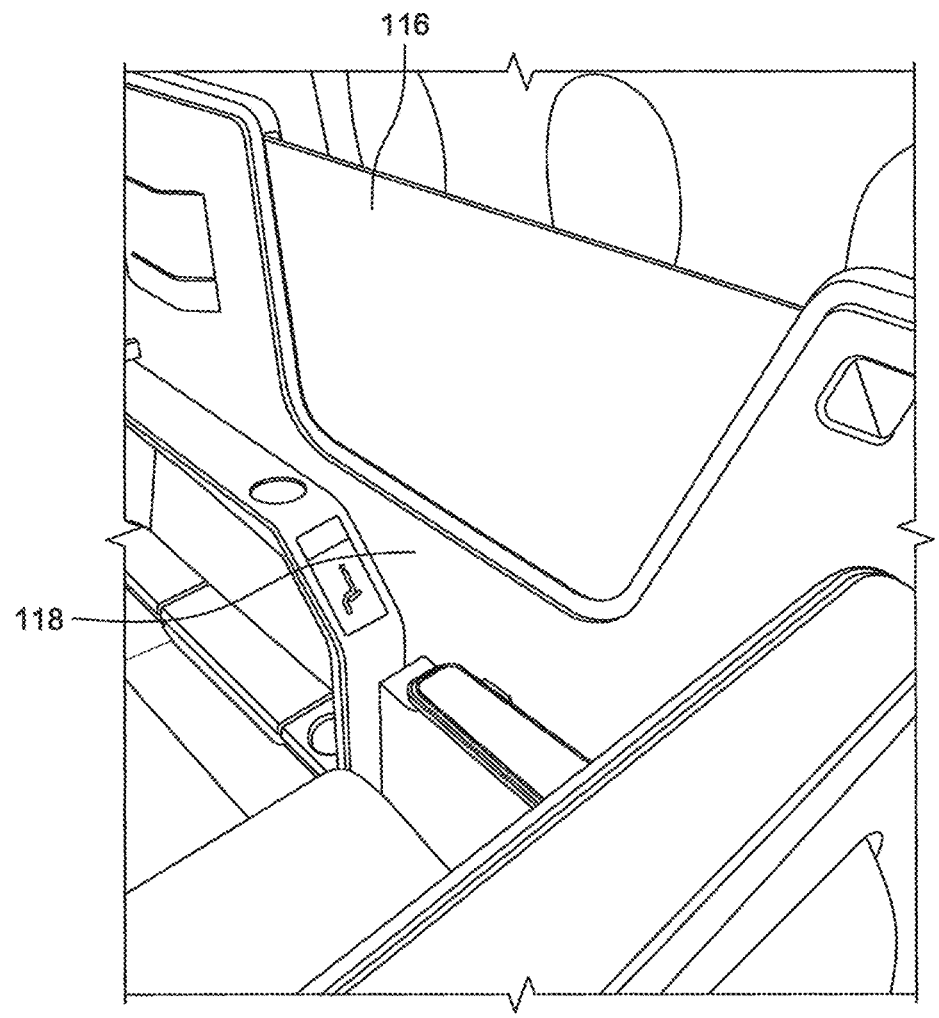
FIG. 12 shows a movable suite-dividing partition.

FIG. 12 shows a deployable partition 116 configured for use between the first and second suites 36, 38, the third and fourth suites 40, 42, and any other laterally adjacent suites. The partition 116 is configured deploy to divide the adjacent suites and stow to connect the adjacent suites. Movement between stowed and deployed positions can include raising or lowering into the partition 118 between the suites, horizontal translation, pivoting movement, and combinations thereof.

Figure 13:
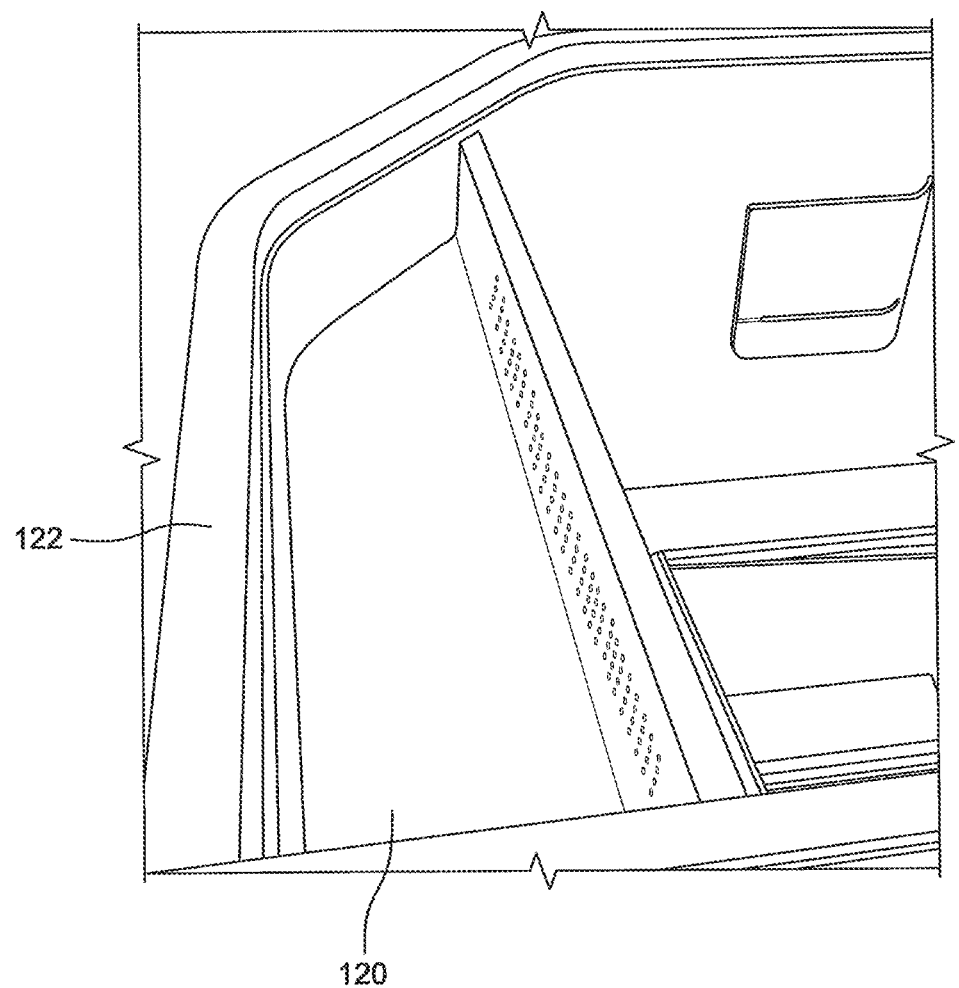
FIG. 13 shows a storage tray located above a video monitor.

FIG. 13 shows a storage tray 120 located above the video monitor. The sides of the storage tray are formed by a combination of the tray 120 itself and the partition walls 122 defining the suite boundaries. The storage tray 120 can be illuminated by way of a hole pattern and internal illumination.

Figure 14:
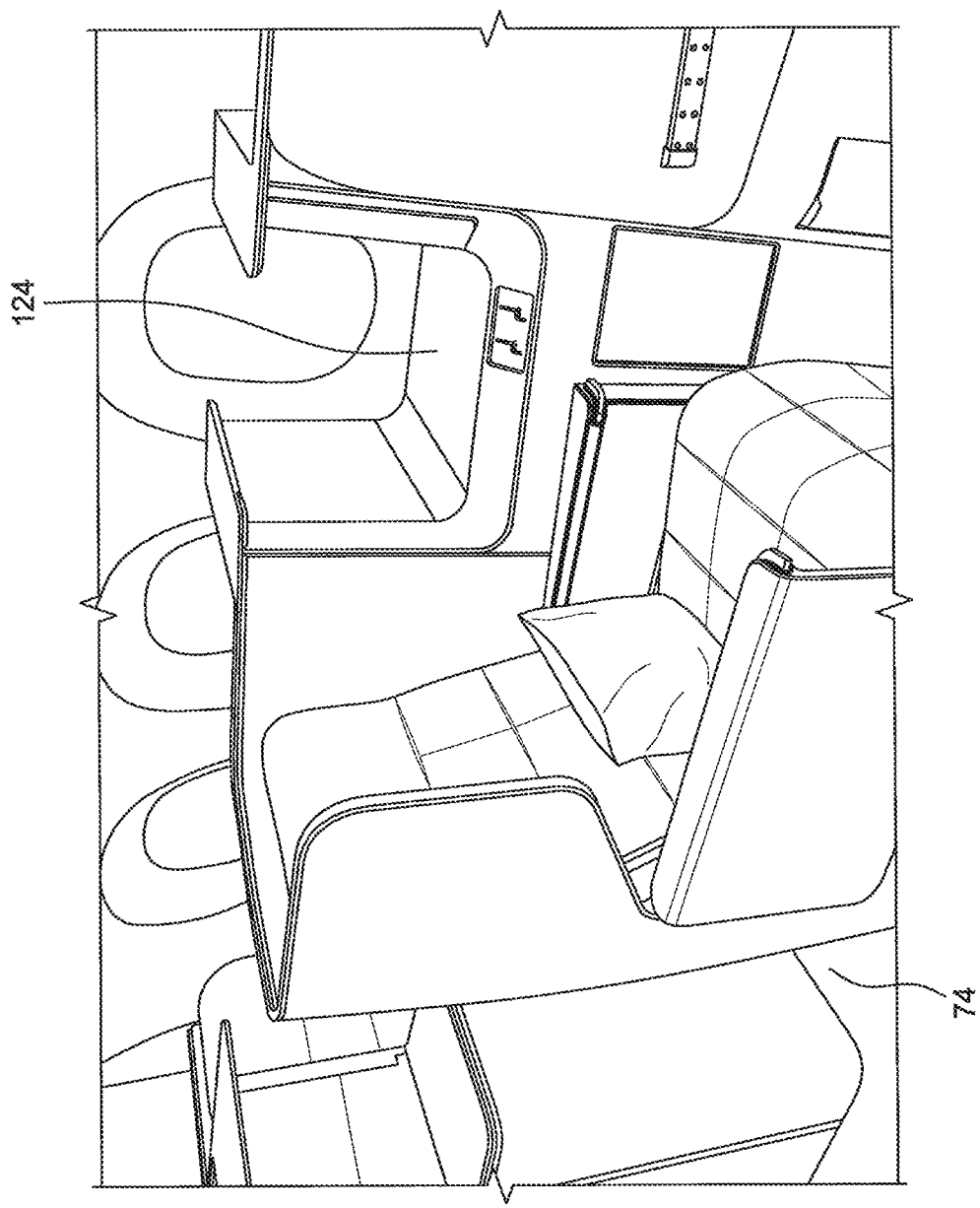
FIG. 14 is a perspective view of a suite arrangement according to an embodiment of the invention.

FIGS. 14 and 15 shows suites of the type found in the first and second columns 70, 72. Suites in the first column 70 as shown can be configured as window suites. Suites in the second column 72 as shown can be configured as aisle suites. The aisle suites in the second column 72 are spaced apart in the longitudinal direction to provide lateral aisles 74, each lateral aisle 74 accessing a single suite in the first column 70. Suites in the first column 70 can be spaced, not to provide an aisle therebetween, but to provide an area 124 laterally-adjacent a suite in the second column 72 for use by the occupant in that suite. As shown, the area 124 includes a horizontal working area and two upright sidewalls.

FIG. 15 shows a door 126 associated with suites in the second column 72 located adjacent one of the longitudinal aisles 28, 30. The door 126 can have a fabric panel construction including an integrally formed vertical portion 128 that extends from floor to top suite wall height, and a cantilevered horizontal portion 130. In the open position of the door shown in FIG. 15, the door stows alongside the video monitor 76 such that the horizontal portion 130 covers the top of the video monitor 76 and the suite is accessible. In the closed position, the horizontal portion 130 covers a middle portion of the length of the suite, thereby closing the suite and enhancing privacy. In a particular embodiment, the door 126 can be configured to travel to a position alongside the seat 44 to provide a roof over the seat 44 for enhanced privacy.

The foregoing description provides embodiments of the invention by way of example only. It is envisioned that other embodiments may perform similar functions and/or achieve similar results. Any and all such equivalent embodiments and examples are within the scope of the present invention and are intended to be covered by the claims.

What is claimed is:

1. A four-suite unit positionable in an aircraft cabin to one side of a longitudinal aisle, comprising:
   first and second suites positioned longitudinally-aligned;
   third and fourth suites positioned longitudinally-aligned and to one side of the respective first and second suites, the third suite laterally misaligned relative to the first suite and the fourth suite laterally misaligned relative to the second suite;
   a first passageway positioned between a foot end of the first suite and a head end of the second suite providing access to the third suite, and only the third suite, from the longitudinal aisle; and a second passageway positioned at a foot end of the second suite providing access to the fourth suite, and only the fourth suite, from the longitudinal aisle;

wherein each of the first and second suites are directly accessible only from the longitudinal aisle through an entrance provided between privacy walls positioned adjacent the longitudinal aisle;

wherein the first, second, third and fourth suites are parallel to each other; and wherein the first and second suites are longitudinally-spaced apart by a width of the first passageway and the third and fourth suites are positioned directly longitudinally adjacent each other and are separated by a shared privacy wall.

2. The four-suite unit of claim 1, wherein each of the first, second, third and fourth suites includes a passenger seat convertible from an upright sitting position to a lay-flat bed.

3. The four-suite unit of claim 2, wherein each of the first, second, third and fourth suites includes a footwell spaced forward of a forward end of the passenger seat.

4. The four-suite unit of claim 2, wherein each of the first, second, third and fourth suites includes an ottoman positioned forward of a forward end of the passenger seat.

5. The four-suite unit of claim 1, further comprising a shared privacy wall dividing the first and third suites.

6. The four-suite unit of claim 1, further comprising a shared privacy wall dividing the second and fourth suites.

7. The four-suite unit of claim 1, wherein the first, second, third and fourth suites are parallel to the longitudinal aisle.

\* \* \* \* \*